Sept. 22, 1964 F. J. JOYCE 3,149,733
SELF-UNLOADER
Filed Oct. 9, 1962 3 Sheets-Sheet 1
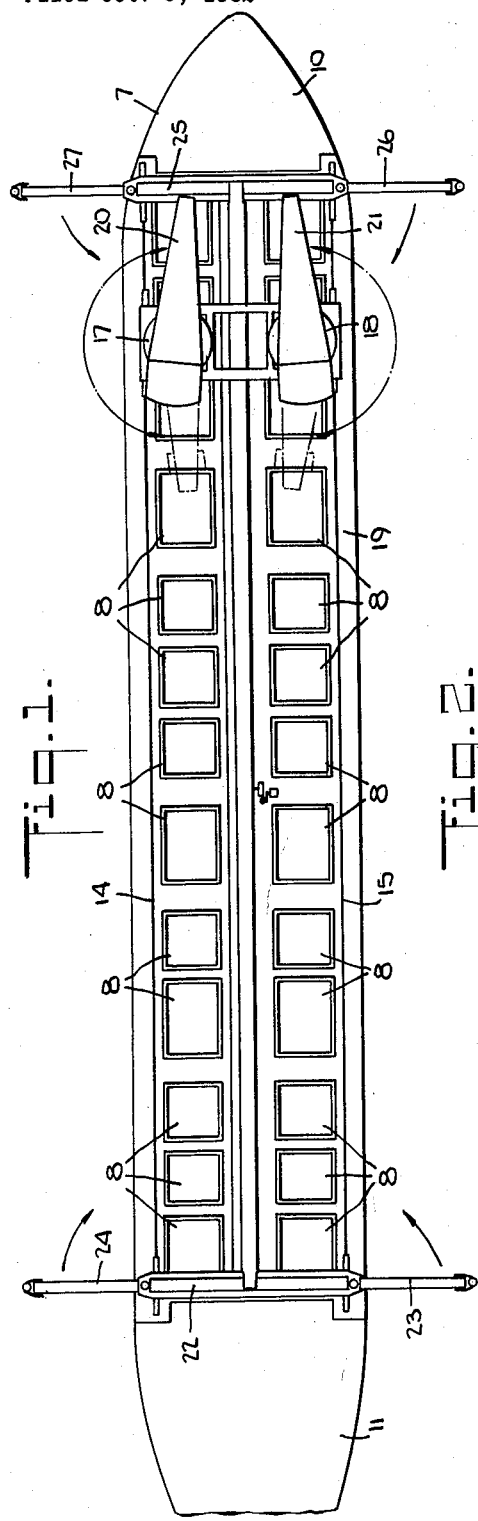
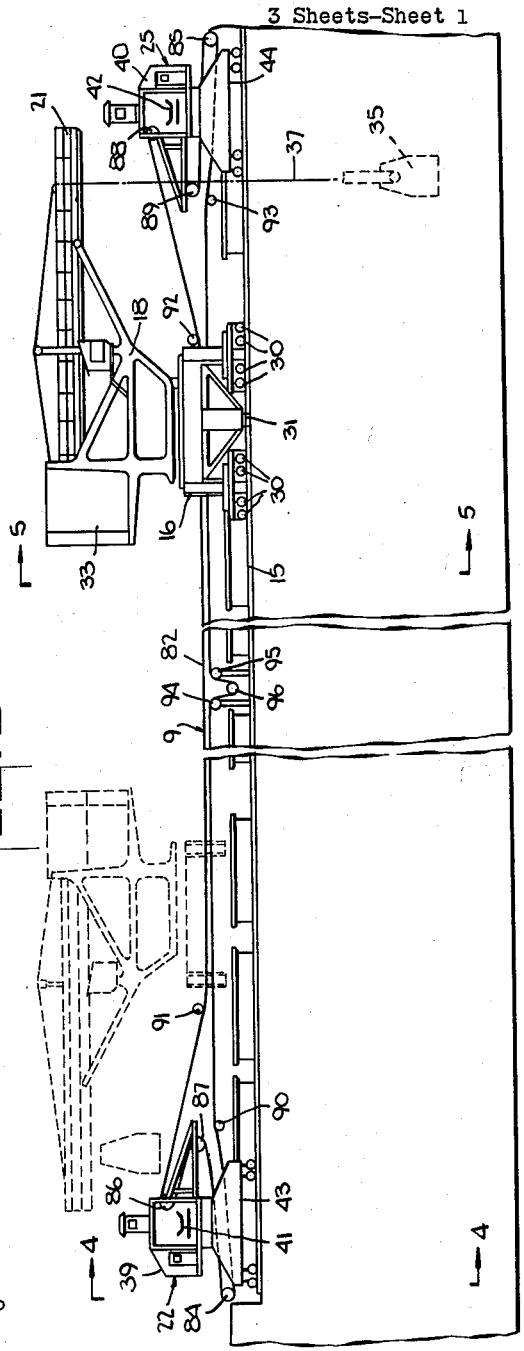
INVENTOR.
FRANCIS J. JOYCE
BY
ATTORNEYS

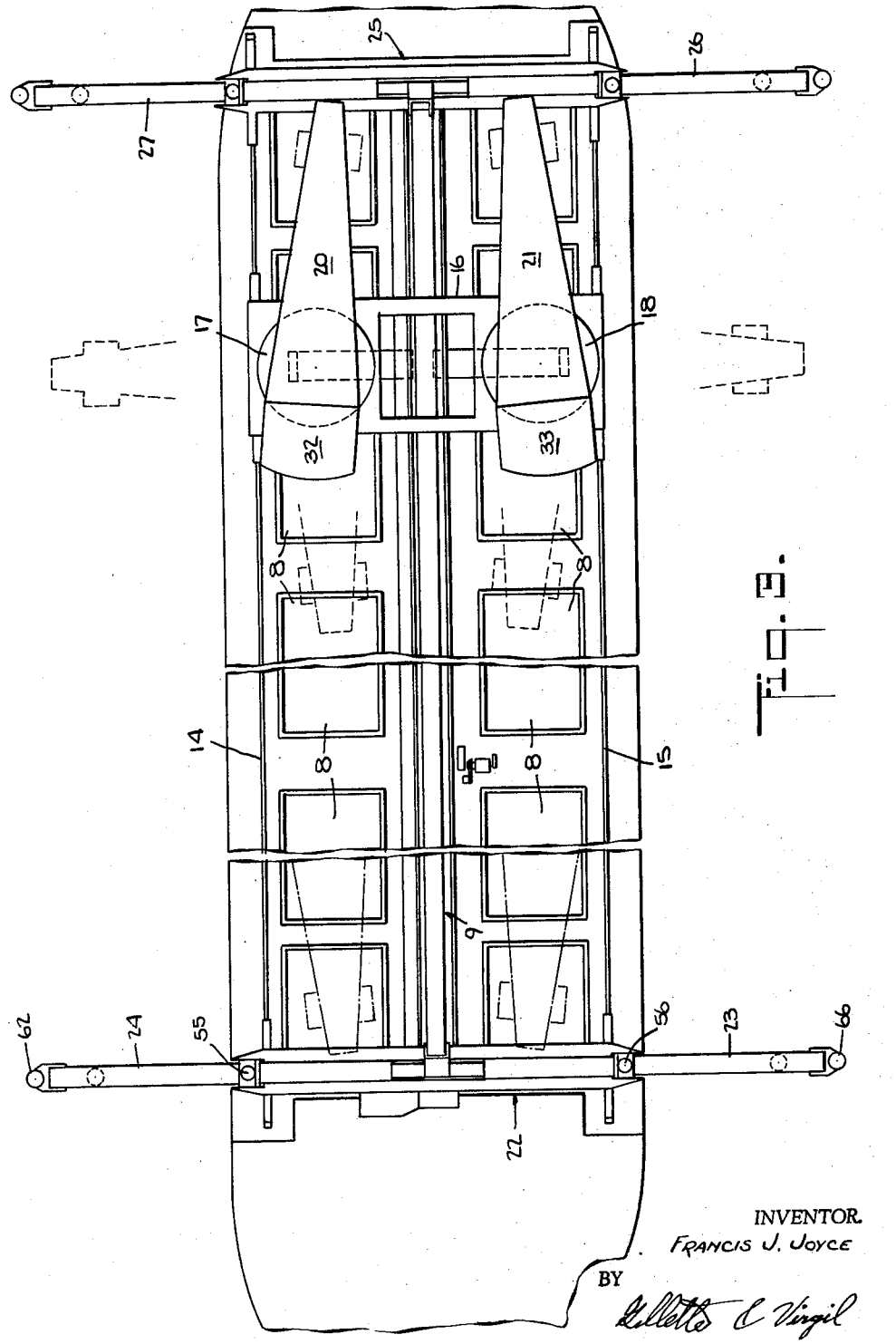

INVENTOR.
Francis J. Joyce

ATTORNEYS

United States Patent Office 3,149,733
Patented Sept. 22, 1964

3,149,733
SELF-UNLOADER
Francis J. Joyce, Morris Plains, N.J., assignor to National Bulk Carriers, Inc., New York, N.Y., a corporation of Delaware
Filed Oct. 9, 1962, Ser. No. 229,783
5 Claims. (Cl. 214—15)

This invention relates to a mechanical self-unloading system which is especially adapted for loading and unloading cargo to and from a ship.

The loading and unloading of ship cargo requires considerable time and effort, and therefore constitutes an important part in the economy of shipping cargo by water. Various methods are being employed for this purpose, but unfortunately, all of them are not entirely satisfactory for one reason or another. In the matter of loading and unloading cargo, it is important that the operation be as automatic as possible to avoid undue consumption of time. Optimumly, the cargo should be picked up at one point and discharged at another location without any interruption of the flow of cargo. The present invention is concerned with a loading system that can handle cargoes mechanically and with a minimum of manual labor. In particular, this invention is directed to a loading system that can handle cargoes that cannot be handled at all by other types of apparatus, such as the gravity-hopper system.

An object of this invention is to provide a system for the loading and unloading of cargo to and from a ship.

Another object of this invention is to provide a system for loading and unloading cargo to and from a ship, which system can handle certain types of cargoes that cannot be handled at all by known, relatively automatic systems.

Other objects and advantages of this invention will become apparent from the following description and explanation thereof.

The system of the present invention comprises pick up means such as a crane and bucket, a main conveyor means positioned longitudinally on the deck of a ship and arranged to convey material from one end to the other, and cross conveyor means situated on either side of the pickup means and arranged to receive the material from the main conveyor means for transfer to a hold of the ship or to an offshore position. Each cross conveying means is capable of moving in a longitudinal direction on the deck of the ship.

A better understanding of the present invention will be had by reference to the accompanying drawings which form a part of this specification and wherein:

FIGURE 1 is a top view of the ship showing the relationship between the pickup means and the cross conveying means with reference to the holds of the ship;

FIGURE 2 is a frontal view of the ship showing the pickup means and the cross conveying means in relation to the main conveying means which runs the length of the ship;

FIGURE 3 is a more detailed top view of the loading system shown in FIGURE 1;

Figure 4:
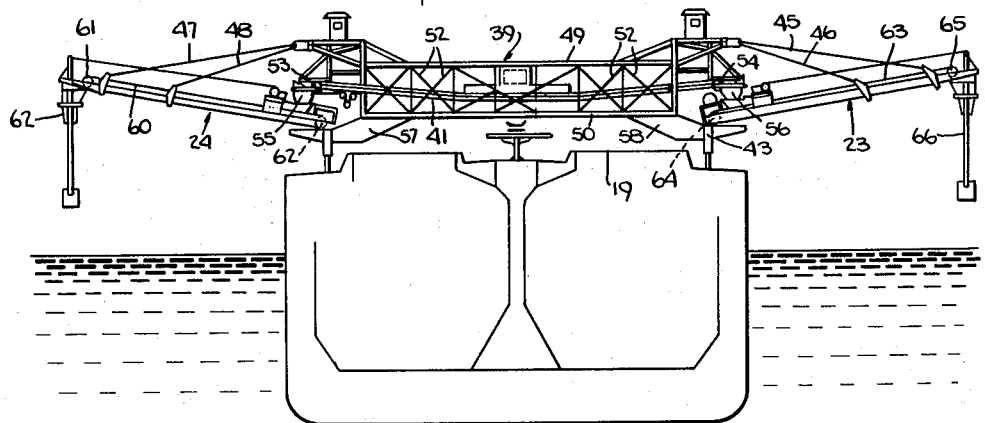
FIGURE 4 is an end view taken along line 4—4 of FIGURE 2.

Referring to the drawings, a ship 7 contains a series of holds or storage compartments 8 spaced as pairs along the length of the ship. A conveyor 9 is positioned in the center of the ship and extends the same length as the part of the ship in which the holds 8 are located, which is approximately just short of reaching either the bow 10 or the stern 11. At a position near each side of the ship are positioned rails 14 and 15 which extend longitudinally along the deck of the ship for approximately the same distance as the conveyor 9. One row of storage compartments 8 is positioned between the rail 14 and conveyor 9 and the second row is between the rail 15 and conveyor 9. A crane carriage 16 is supported on the rails 14 and 15 and is capable of moving the length of the ship in a position straddling both the holds 8 and the conveyor 9. The means (not shown) for moving the carriage 16 comprises an electrically-driven wheel operating through a geared speed reducer resting on the deck track 14 and 15. Two cranes 17 and 18 are supported on the crane carriage 16 which are pivotal and can be positioned over the holds 8 as the carriage transverses the length of the ship deck 19. Crane 17 carries a boom 20, whereas crane 18 carries a boom 21. Each of the booms 20 and 21 is capable of pivoting through an angle of at least 180° in its supported position on the respective cranes 17 and 18.

As previously mentioned, a cross conveyor means is positioned on either side of the cranes 17 and 18. Toward the stern 11 of the ship there is positioned a cross conveyor 22 having boom conveyors 23 and 24 attached to its ends. Each boom conveyor 23 and 24 is capable of rotating through an angle of about 270°, but it is not capable of being raised or lowered from its position. Toward the bow of the ship is situated another cross conveyor 25 with boom conveyors 26 and 27 attached to its ends. Similarly, the boom conveyors 26 and 27 are capable of rotating through an angle of 270°, but cannot be raised or lowered from their positions. The cross conveyors 22 and 25 are moved back and forth on their respective carriages by means similar to the means for moving carriage 16; i.e., an electrically-driven wheel operating through a geared speed reducer resting on the deck track 14 and 15. The pivotation of booms 23, 24, 26, and 27 may be accomplished by means of electric motors driven through speed reducers.

Referring to FIGURE 2, the crane carriage 16 is supported on the rails 14 and 15 by means of flanged rollers 30. The carriage 16 also contains guide 31 and a similar guide on the other side of the carriage which engages the side of the rails 14 and 15 to eliminate sidewise movement of the carriage 16. Two buckets 34 and 35 are suspended from the cranes 17 and 18, which are balanced by displacement of their machinery and structure. The buckets 34 and 35 are supported by travelling lines or cables 36 and 37, respectively, which lines suspend from cranes 20 and 21, respectively.

The cross conveyors 22 and 25 contain carriages 39 and 40, respectively, upon which are supported the cross conveyor belts 41 and 42, respectively. The carriages 39 and 40 of the respective cross conveyors 22 and 25 are supported on cross conveyor carriage bases 43 and 44, respectively.

Referring to FIGURE 4 wherein the structural details of cross conveyor 22 are shown, it will be noted that the ends of cross conveyor belt 41 terminate just beyond the points at which boom conveyors 23 and 24 begin. The carriage 39 has cables 45 and 46 fixed to it, which extend to the boom conveyor 23 for maintaining the same in a fixed elevated position. Similarly, there are depending from carriage 39, cables 47 and 48, which support boom conveyor 24 in a fixed elevated position. The carriage 39 consists of two vertically spaced girders 49 and 50, which are parallel to the deck 19 of the ship. The girders 49 and 50 are maintained in their positions by means of crisscrossing truss members, as exemplified by truss members 52.

The endless cross conveyor belt 41 is mounted on rollers 53 and 54, which are located at each end of crane 39. Below the rollers 53 and 54 are positioned hoppers 55 and 56 for the purpose of receiving and material which passes over the end of the cross conveyor belt 41. To prevent spillage of material onto the deck of the ship, scraper bars are fitted at each head pulley to clean the belt and spill excess material into the hoppers. As to boom conveyor 24, the endless boom conveyor belt 60 is supported on stationary rollers 61 and 62, which are spaced at the respective ends of the boom conveyor 24. Below the roller 61 of the conveyor 24 depends a telescopic chute 62 which guides the stream of falling material to a storage compartment 8 or to an outboard position of the ship. The chute 62 also reduces loss by wind when the material being transferred must fall a great distance. The other boom conveyor 23 likewise contains an endless boom conveyor belt 63 which is supported on rollers 64 and 65. Below the roller 65, at the outer end of the conveyor 23, there is positioned a telescopic chute 66 which serves the same purpose as chute 62.

Figure 5:
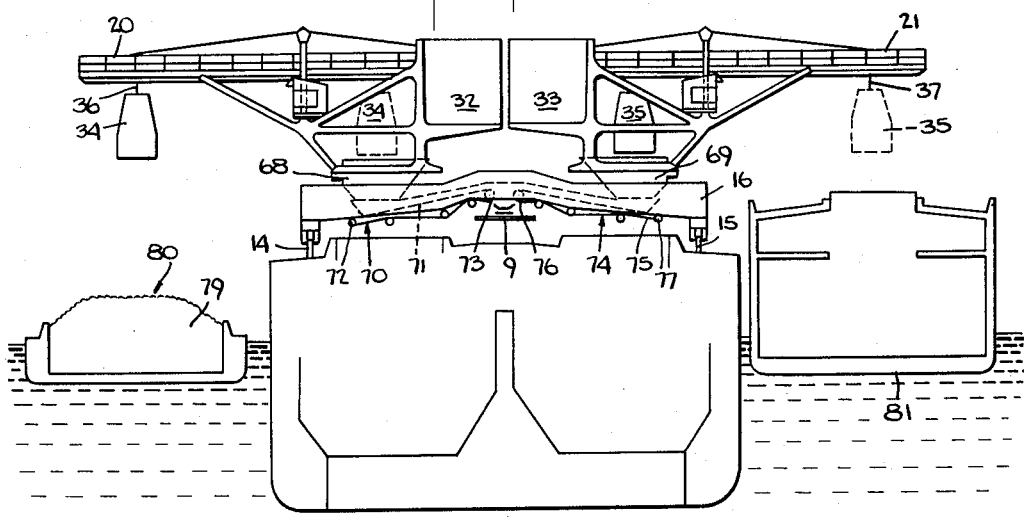
FIGURE 5 is an end view taken along line 5—5 of FIGURE 2.

Referring to FIGURE 5 for the details of the structural design of cranes 20 and 21, it will be noted that bucket hoppers 68 and 69 are provided at the bottom part of cranes 17 and 18 respectively, and serve to receive the material which is dumped from buckets 34 and 35, respectively. Below the bucket hopper 68, a belt feeder 70, consisting of an endless conveyor belt 71 mounted on rollers 72 and 73, is located. The conveyor belt 71 is transverse to the length of the ship, extending from the bucket hopper 68 to the tripper conveyor 9. Similarly, a second belt feeder 74, consisting of an endless conveyor belt 75 and rollers 76 and 77, is located below bucket hopper 69. The roller 76 is positioned above the conveyor 9 at the central part of the deck, whereas the roller 77 is situated below the bucket hopper 69. The bucket 34 is shown above a barge 79, which is filled with material to be loaded on the ship. The barge 79 is of flat top construction containing the material 80. At the other side of the ship 7 there is another barge 81 which contains storage compartments from which the bucket 35 removes material. The barges 79 and 81 serve to illustrate two different situations in which material can be transferred by the loading system of the present invention.

The conveyor 9 contains an endless conveyor belt 82 which extends the length of the ship where the storage compartments 8 are located. The over-all length of the conveyor belt 82 is not changed in operation by virtue of the fact that the belt 82 is mounted on rollers 84 and 85 each of which is positioned at an end of the conveyor system. The rollers 84 and 85 are not movable in spite of the longitudinal movement of the cross conveyors 22 and 25. The upper part of the conveyor belt 82 passes over a roller 86 and then around another roller 87 before passing around the roller 84. The rollers 86 and 87 are mounted on the cross conveyor 22. Similarly, at the other end of the ship the conveyor 82 passes over rollers 88 and 89 which are positioned on the cross conveyor 25. The conveyor belt 82 first passes around the roller 89 and then around the roller 85 which is mounted on the deck of the ship. The auxiliary rollers 90, 91, 92, and 93 serve to guide the conveyor belt 82 in its travel along the length of the ship. At about the center of the ship, there are mounted two parallel rollers 94 and 95 between which is mounted a roller 96 in a lower position. These rollers serve to keep proper tension in the endless conveyor belt 82 in its travel along the length of the ship.

Referring to FIGURE 2 it will be noted that the conveyor 9 is positioned so that material passes to one of the cross conveyor belts 41 and 42, depending upon the direction of travel of the conveyor belt 82. The position of the conveyor belt 82 with respect to the cross conveyors 22 and 25 is always maintained in a higher position by reason of rollers 86 and 88 being in elevated positions with respect to the cross conveyor belts 41 and 42.

In the operation of the loading device, the material 80 contained in barge 79 may be picked up by bucket 34. The bucket is raised and then travels along the length of the boom 20 to an inboard position above the bucket hopper 68, into which the material 80 is transferred. The material in the hopper 68 passes onto the belt feeder 70 and is transferred by means of the feeder belt 71 to the conveyor belt 82. The latter conveyor belt may operate in the direction of either cross conveyor 22 or cross conveyor 25, depending upon the storage compartment into which the material should pass. Assuming that the particular hold 8 to be filled is in the direction of cross conveyor 22, the conveyor belt 82 will pass the material to cross conveyor belt 41. The direction of travel of cross conveyor belt 41 will also depend upon which hold of the ship is to receive the material. If the hold is on the side of boom conveyor 24, then cross conveyor belt 41 will move in that direction, otherwise the reverse is true. Assuming that the particular hold 8 to be filled is on the same side as boom conveyor 24, the material on the cross conveyor belt 41 will flow onto the boom conveyor belt 60, and from there into the chute 62, which will be positioned over the opening of the desired hold 8.

The operation of the loading device can be reversed in the sense that material can be removed from the hold 8 of the ship by means of either bucket 34 or 35, depending on which side of the ship it is located, and then placed upon the conveyor belt 82 for transfer to either cross conveyor 22 or 25 as the situation warrants. The telescopic chute 62 or 67 may be positioned over the barge or deck position to which the material is transferred.

While this invention has been described in terms of a specific embodiment, it will be apparent that the invention is not limited to just the structure shown but is measured by the following claims.

What is claimed is:

1. An apparatus which comprises a ship provided with a deck, a main boom means positioned on the deck and capable of longitudinal movement with respect thereto, a central conveying means positioned lengthwise in the central part of the deck, a cross conveyor means situated on each side of the main boom means and capable of longitudinal movement on the deck of the ship, the central conveyor means being adapted to pass material to either of the cross conveyor means, and a boom conveyor means associated with each cross conveyor means and adapted to receive material therefrom, and means for picking up material with the use of the main boom means and to transfer the same to the central conveyor means.

2. An apparatus which comprises a ship containing a series of cargo compartments accessible from the deck thereof, a main crane positioned on the deck superposing the cargo compartments and carrying a boom thereon, said main crane being capable of longitudinal movement along the deck of the ship, a central conveyor belt situated within reach of the cargo compartments on the deck of the ship and superposed by the main crane, a feed belt carried by the crane and positioned to transfer material from the crane to the central conveyor belt, a cross crane positioned on each side of the main crane and carrying a cross conveyor belt, and capable of moving longitudinally on the deck of the ship, the central conveyor belt being arranged with respect to the cross conveyor belts that the cargo on the former can be transferred to the latter, and a pivotal boom conveyor extending from each end of the cross conveyor and carrying a boom conveyor belt by which material on the cross conveyor belt is transferred to a dumping site.

3. An apparatus which comprises a ship having two rows of cargo compartments along the length thereof which are accessible from the deck, a central conveyor means situated between the rows of cargo compartments and capable of transferring material from one end of the cargo compartments to the other, two cross conveyor means positioned transversely on the deck and capable of moving longitudinally on the deck and transferring cargo in a transverse direction, with respect thereto, the central conveyor means being associated with cross conveyor means such that the cargo is transferred from the former to either of the latter at any position thereof on the deck, a crane positioned between the cross conveyor means and capable of moving longitudinally on the deck in an elevated position above the main conveyor means, two pivotal booms mounted on the crane in side by side relationship and equipped with bucket means, a feed conveyor means positioned on the crane and associated with each boom whereby cargo is transferred from the bucket means to the central conveyor means, and boom conveyor means associated with each cross conveyor means whereby the cargo on the cross conveyor means is transferred to a dumping site.

4. The apparatus of claim 3 wherein the boom conveyor means is pivotal and equipped with a discharge chute means.

5. An apparatus which comprises a ship equipped with two rows of cargo compartments along its length which are accessible from the deck, a central endless conveyor belt mounted on immovable rollers between the rows of cargo compartments and extending the length of the compartments, two cross conveyor cranes mounted on the deck transversely of the central conveyor belt and each carrying an endless cross conveyor belt which is likewise transverse to the central conveyor belt, the central conveyor belt engages rolling means on each of the cross conveyor cranes such that the central conveyor belt terminates above each cross conveyor belt and then winds around each cross conveyor belt before reaching the immovable rollers which are mounted on the deck beyond the cross conveyor cranes, a pivotal boom conveyor means disposed laterally from each end of each of the cross conveyor cranes and carrying a boom conveyor endless belt which is adapted to receive cargo from the cross conveyor belt, a chute means fastened to the outer end of each of the boom conveyor means and adapted to receive cargo from the boom conveyor belt, a main crane positioned transversely on the deck of the ship which is capable of moving the length of the deck in a superposed position above the central conveyor belt, two booms each equipped with bucket means being pivotally mounted on the main crant, the bucket means being capable of moving horizontally along the length of the booms, a feeder endless belt mounted on the main crane and arranged to receive cargo at an inboard position of each of the bucket means and transfer the same to the central conveyor belt, and hopper means for transferring cargo from the bucket means to the feeder belts.

References Cited in the file of this patent

UNITED STATES PATENTS

| | | |
|---|---|---|
| 1,808,862 | Peterson | June 9, 1931 |
| 1,940,488 | Crowells | Dec. 19, 1933 |
| 3,002,634 | Culp et al. | Oct. 3, 1961 |
| 3,052,364 | Pelzer | Sept. 4, 1962 |
| 3,077,270 | Vander Laan et al. | Feb. 12, 1963 |

FOREIGN PATENTS

| | | |
|---|---|---|
| 80,337 | Austria | Mar. 26, 1920 |